UNITED STATES PATENT OFFICE 2,656,352

QUATERNARY SALT DYES DERIVED FROM 2-TERTIARYAMINO-5(4)-THIAZOLONES

Edward B. Knott and Leslie A. Williams, Harrow, England, assignors to Eastman Kodak Company, Rochester, N. Y., a corporation of New Jersey No Drawing. Application October 30, 1951, Serial No. 253,956

10 Claims. (Cl. 260—240.1)

This invention relates to quaternary salt dyes which can be regarded as derived from 2-tertiaryamino - 5(4) - thiazolone merocarbocyanine dyes, and to methods for preparing them.

It is, therefore, an object of our invention to provide new quaternary salt dyes. Another object is to provide methods for making such dyes. Still another object is to provide photographic silver halide emulsions sensitized with our new dyes. Other objects will become apparent from a consideration of the following description and examples.

According to our invention, we provide quaternary salt dyes selected from those represented by the following general formula:

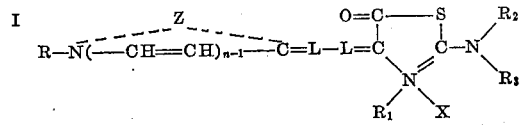

wherein R and $R_1$ each represents an alkyl group, such as methyl, ethyl, n-propyl, n-butyl, n-amyl, isopropyl, isobutyl, benzyl (phenylmethyl), β-hydroxyethyl, β-acetoxyethyl, etc. groups (e. g. primary alkyl groups of the formula $C_mH_{2m+1}$ wherein $m$ represents a positive integer of from 1 to 4), $R_2$ and $R_3$ each represents an alkyl group, such as those given above for R and $R_1$, or an aryl group, such as phenyl, o-, m-, and p-tolyl, p-chlorophenyl, etc. (e. g. a mononuclear aryl group of the benzene series), or $R_2$ and $R_3$ together represent the non-metallic atoms necessary to complete a heterocyclic nucleus containing 6 atoms in the heterocyclic ring, such as piperidyl, morpholinyl, etc. (e. g. a heterocyclic nucleus containing one nitrogen atom, 4 carbon atoms and an oxygen atom or a fifth carbon atom), $n$ represents a positive integer of from 1 to 2, L represents a methine group (substituted or unsubstituted), X represents an anion, such as chloride, bromide, iodide, perchlorate, thiocyanate, sulfamate, acetate, p-toluenesulfonate, benzenesulfonate, etc., and II represents the non-metallic atoms necessary to complete a heterocyclic nucleus containing from five to six atoms in the heterocyclic ring, such as those selected from the group consisting of those of the thiazole series (e. g. thiazole, 4-methylthiazole, 4-phenylthiazole, 5-methylthiazole, 5-phenylthiazole, 4,5 - dimethylthiazole, 4,5 - diphenylthiazole, 4 - (2 - thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thionaphtheno-7',6',4,5-thiazole series (e. g. 4'-methoxythianaphtheno-7',6',4,5 - thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5 - phenylbenzoxazole, 6 - methylbenzoxazole, 5,6 - dimethylbenzoxazole, 4,6 - dimethylbenzoxazole, 5 - methoxybenzoxazole, 5-ethoxybenzoxazole, 5-chlorobenzoxazole, 6 - methoxybenzoxazole, 5 - hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5 - methoxybenzoselenazole, 5 - hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), the pyridine series (e. g. pyridine, 5-methylpyridine, etc.), etc.

The quaternary salt dyes represented by Formula I above can advantageously be prepared by treating a merocarbocyanine dye selected from those represented by the following general formula:

II
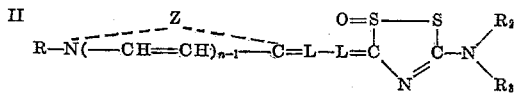

wherein R, $R_2$, $R_3$, n, L, and Z each have the values given above, with an alkyl salt, e. g. an alkyl p-toluenesulfonate, such as methyl p-toluenesulfonate, ethyl p-toluenesulfonate, etc. The reaction can be carried out by heating the alkyl salt and the dye of Formula II together, e. g. at the fusion temperature, until a water-soluble product is obtained.

The merocarbocyanine (i. e. dimethinemerocyanine) dyes represented by Formula II above can be prepared by condensing a compound selected from those represented by the following general formula:

III
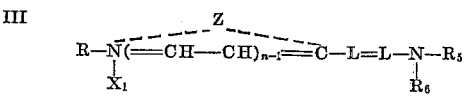

wherein R, n, L, and Z each have the values given above, $R_5$ represents an aryl group, e. g. phenyl, o-, m-, and p-tolyl, etc. (e. g. a mononuclear aryl group of the benzene series), $R_6$ represents an acyl group, e. g. acetyl, propionyl, benzoyl, etc., and $X_1$ represents an anion, such as those set forth above for X, with a compound selected from those represented by the following general formula:

IV
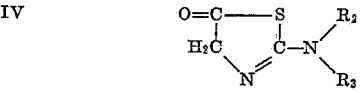

wherein $R_2$ and $R_3$ each have the values given above. The condensations are advantageously carried out in the presence of a basic condensing agent, e. g. the organic tertiary amines, such as triethylamine, tri-n-butylamine, N-methylpiperidine, N,N-dimethyl aniline, etc. The condensations can advantageously be effected in the presence of an inert solvent, e. g. ethanol, isopropanol, 1,4-dioxane, etc. Heat accelerates the condensations and temperatures varying from room temperature (about 20° C.) to the temperature of the steam bath can be used.

The compounds represented by Formula IV above can advantageously be prepared by treating a compound selected from those represented by the following general formula:

V
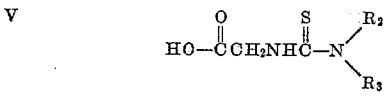

wherein $R_2$ and $R_3$ have the values given above, with phosphorus tribromide. The compounds represented by Formula V above can be prepared by condensing N-dithiocarbethoxyglycine, i. e.

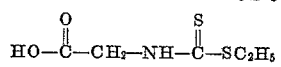

with a secondary organic amine, such as those represented by the following general formula:

VI

wherein $R_2$ and $R_3$ each has the values given above, in the presence of an alkali metal hydroxide, e. g. sodium and potassium hydroxide, etc.

The following examples will serve to illustrate more fully the manner whereby we practice our invention.

*Example 1.*—[2-(3-ethylbenzoxazole)] [4-(2-diethylamino - 5 - keto -3- methylthiazolinium)] dimethinemerocyanine p-toluenesulfonate

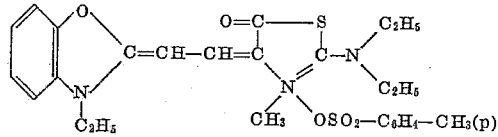

[2-(3 - ethylbenzoxazole)] [4-(2 - diethylamino-5(4)-thiazolone)] dimethinmerocyanine (1.77 g., .005 mol.) and methyl p-toluenesulfonate (0.93 g., .005 mol.) were heated together at 140° C. until the product was water-soluble. It was ground and refluxed with anhydrous benzene. The insoluble material was filtered off and recrystallised from ethanol-ether, as a yellow amorphous powder, M. P. 175° C. This was found to sensitize a silver chloride emulsion with a peak at 570 m$\mu$, and a bromiodide emulsion with a peak at 560 m$\mu$.

*Example 2.*—[2-(3-ethylbenzoxazole)] [4-(2-{1'-piperidyl} - 5 - keto - 3 - methylthiazolium)] dimethinemerocyanine p-toluenesulfonate

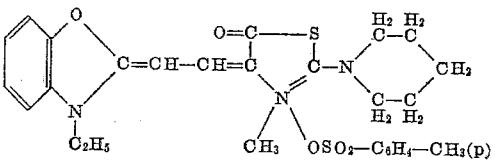

[2-(3-ethylbenzoxazole)] [4-(2-{1'-piperidyl}-5(4)-thiazolone)] dimethinmerocyanine (1.85 g., .005 mol.) and methyl p-toluenesulfonate (0.93 g., .005 mol.) were heated together at 140° C. until the product solidified. This was refluxed with anhydrous benzene and the insoluble material filtered off and recrystallised from ethanol-ether as orange crystals M. P. 180° C. These sensitized a silver chloride emulsion with a peak at 560 m$\mu$.

*Example 3.*—[2-(3-ethylbenzoselenazole)] [4-(2-{4' - morpholinyl} - 5 - keto - 3 - methylthiazolinium)] dimethinemerocyanine p-toluenesulfonate

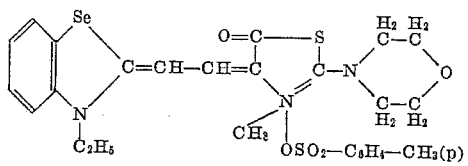

[2-(3-ethylbenzoselenazole)] [4-(2-{4'-morpholinyl}-5(4)-thiazolone] dimethinmerocyanine (4.2 g., .01 mol.) and methyl p-toluenesulfonate (1.86 g., .01 mol.) were heated together at 140° C. until the product was water-soluble. This was refluxed with benzene and the insoluble material filtered off and recrystallised from ethanol as red crystals, M. P. 215° C. This sensitized a silver chloride emulsion with a peak at 570 m$\mu$.

By replacing the methyl p-toluenesulfonate used in the above example by 0.01 mol .of ethyl p-toluenesulfonate, the dye represented by the formula:

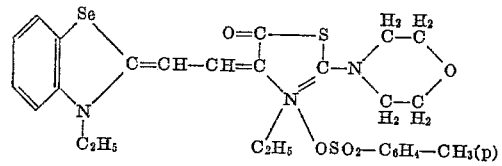

can be obtained.

*Example 4.*—*[2-(3-ethylbenzothiazole)] [4-(2-ethylphenylamino - 5 - keto - 3 - methylthiazolium)] dimethinemerocyanine p-toluenesulfonate*

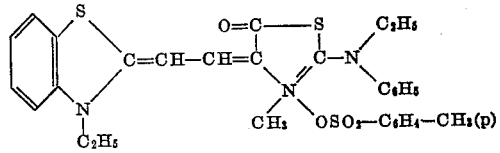

Replace the [2-(3-ethylbenzoxazole)] [4-(2-diethylamino-5(4)-thiazolone)] dimethinemerocyanine used in Example 1 by 0.005 mol. of [2-(3-ethylbenzothiazole)] [4 - (2 - ethylphenylamino-5(4)-thiazolone)] dimethinemerocyanine.

*Example 5.*—*[2-(3-ethylbenzothiazole)] [4-(2-diethylamino - 5 - keto - 3 - methylthiazolinium)] dimethinecyanine p-toluenesulfonate*

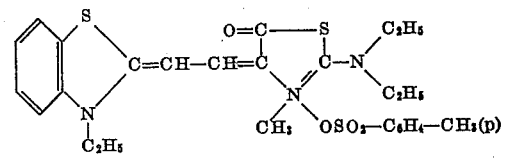

Replace the [2-(3-ethylbenzoxazole)] [4-(2-diethylamino-5(4)-thiazolone)] dimethinemerocyanine used in Example 1 by 0.005 mol. of [2-(3-ethylbenzothiazole)] [4-(2-diethylamino-5(4)-thiazolone)] dimethinemerocyanine.

Alternatively the dyes of our invention represented by Formula I above can be prepared by condensing a quaternized merocyanine dye selected from those represented by the following general formula:

VII
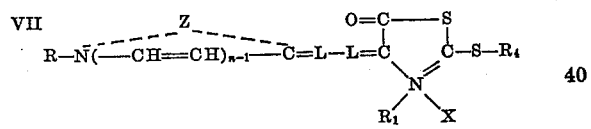

wherein R, R₁, n, L, X, and Z have values given above and R₄ represents an alkyl group, such as those represented by R and R₁ as defined above, with a secondary organic amine, such as those defined by formula VI above. The quaternized dyes represented by Formula VII above can be prepared as described in Aubert, Jeffreys, and Knott U. S. application Serial No. 220,332, filed March 2, 1951. The condensations can advantageously be carried out in the presence of a basic condensing agent, such as tertiary organic amines, e. g. triethylamine, tri-n-butylamine, N,N-diethylaniline, N-methylpiperidine, etc. An inert organic solvent can be used, if desired. Typical solvents include, for example, ethanol, n-propanol, isopropanol, n-butanol, etc. Heat accelerates the condensations, and temperatures varying from room temperature (about 20° C.) to reflux temperature can be used.

The following will serve to illustrate further this method of preparing the new dyes of our invention.

*Example 6.*—*[2 - (3 - ethylbenzoxazole)] [4 - (2-{4' - morpholinyl} - 3 - methyl - 5 - ketothiazolinium)] dimethinemerocyanine p-toluenesulfonate*

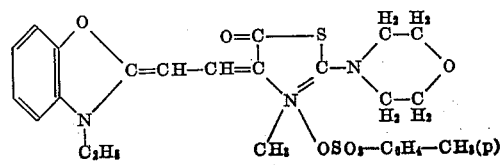

[2-(3-ethylbenzoxazole)] [4-(2-ethylthio-5(4)-thiazolone)] dimethinemerocyanine (1.66 g., .005 mol.) was heated with methyl-p-toluenesulfonate (0.93 g., .005 mol.) until the product was water-soluble. The product was extracted with anhydrous benzene and the quaternary salt heated with morpholine (.43 g., .005 mol.) and triethylamine (0.7 c. c.) in ethanol (7 c. c.) for ½ hour. On cooling the dye was filtered off and recrystallised from ethanol as small red crystals with a green reflex, M. P. 156° C. This was found to sensitize a silver chloride emulsion with a peak at 580 mµ. and a bromiodide emulsion with a peak at 570 mµ.

*Example 7.*—*[2-(3-methylthiazoline)] [4(-2-{4' - morpholinyl} - 3 - methyl - 5 - ketothiazolium)] dimethinemerocyanine p-toluenesulfonate*

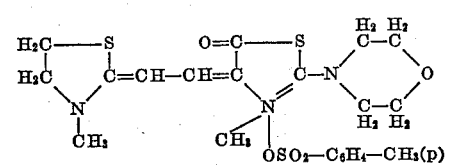

Replace the [2-(3-ethylbenzoxazole)] [4-(2-ethylthio-5(4)-thiazolone)] dimethinemerocyanine of Example 6 with 0.005 mol. of [2-(3-methylthiazoline)] [4-(2-ethylthio-5(4)-thiazolone)] dimethinemerocyanine.

*Example 7a.*—*[2-(3-ethylbenzoxazole)] [4-(2-{4' - morpholinyl} - 3 - ethyl - 5 - ketothiazolium)] dimethinemerocyanine iodide*

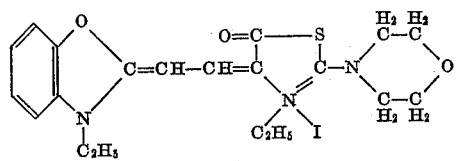

Replace the quaternized [2-(3-ethylbenzoxazole)] [4-(2-ethylthio-5(4)-thiazolone)] dimethinemerocyanine dye obtained in Example 6 with 0.005 mol. of [2-(3-ethylbenzoxazole)] [4-(2-ethylthio-5(4)-thiazolone)] dimethinemerocyanine ethiodide.

The following examples will serve to illustrate more fully the manner whereby we prepared the dimethinemerocyanine dyes represented by Formula II above.

*Example 8.*—*[2-(3-ethylbenzoxazole)] [4-(2-diethylamino-5(4)-thiazolone)] dimethinemerocyanine*

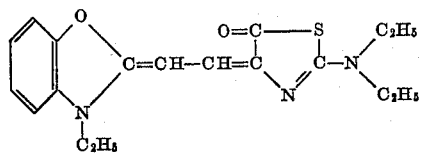

2-diethylamino-5(4)-thiazolone hydrobromide (2.5 g., .01 mol.) was dissolved in ethanol (10 cc.). To this solution 2-β-acetanilidovinylbenzoxazole ethiodide (4.4 g., .01 mol.) was added, followed by triethylamine (2.8 cc., .02 mol.). The mixture was heated on a steam bath for 5 minutes, cooled and the solid filtered off and recrystallised from ethanol as brick-red needles, M. P. 163° C.

*Example 9.*—[2-(*3-ethylbenzothiazole*)] [*4-(2-diethylamino-5(4)-thiazolone*)] *dimethinemerocyanine*

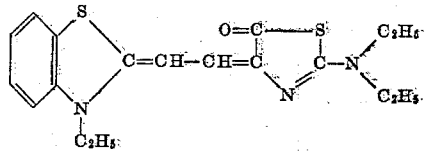

2-diethylamino-5(4)-thiazolone hydrobromide (2.5 g., .01 mol.) 2-β-acetanilidovinylbenzothiazole ethiodide (4.5 g., .01 mol.) and triethylamine (2.8 cc., .02 mil.) were heated together in ethanol (10 cc.) for 5 mins. The mixture was cooled and the dye filtered off and recrystallized from ethanol as maroon plates, M. P. 156° C.

*Example 10.*—[2-(*3-ethylbenzothiazole*)] [*4-(2-ethylphenylamino-5(4)-thiazolone*)] *dimethinemerocyanine*

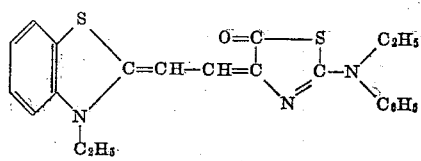

2-ethylphenylamino-5(4)-thiazolone hydrobromide (2 g., .007 mol.), 2-β-acetanilidovinylbenzothiazole ethiodide (3.0 g., .007 mol.) and triethylamine (2 cc., .007 mol.) were heated together in ethanol (10 cc.) for 5 mins. The solution was cooled and dye filtered off and recrystallized first from ethanol and then from ethanol as brick-red prisms, M. P. 178° C.

*Example 11.*—[2-(*3-ethylbenzoxazole*)] [*4-(2-ethylphenylamino-5(4)-thiazolone*)] *dimethinemerocyanine*

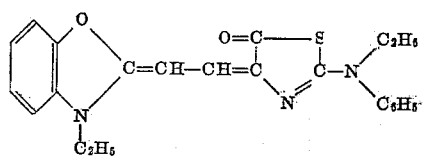

2-β-acetanilidovinylbenzoxazole ethiodide (2.9 g., .007 mol.) and triethylamine (2 cc., .007 mol.) were heated with 2-ethyl-phenylamino-5(4)-thiazolone hydrobromide (2 g., .007 mol.) in ethanol (10 cc.) for 5 mins. The mixture was chilled and the crystals filtered off and recrystallized from ethanol (M. P. 183° C.) as small orange crystals.

*Example 12.*—[2-(*3-ethylbenzoselenazole*)] [4-(2-ethylphenylamino-5(4)-thiazolone)] *dimethinemerocyanine*

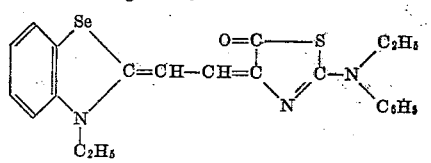

2-ethylphenylamino-5(4)-thiazolone hydrobromide (2 g., .007 mol.), 2-β-acetanilidovinylbenzoselenazole ethiodide (3.3 g., .007 mol.) and triethylamine (2 c. c., .007 mol.) were heated together in ethanol (10 cc.) for 5 mins. The mixture was cooled and the dye filtered off and recrystallized from ethanol (M. P. 253° C.) as green plates.

*Example 13.*—[2-(*3-ethylbenzoxazole*)] [4-{2-(4'-morpholinyl)-5(4)-thiazolone}] *dimethinemerocyanine*

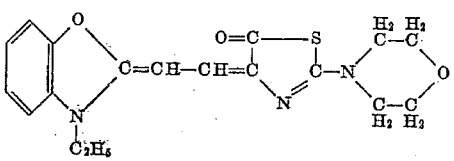

2-(4'-morpholinyl)-5(4)-thiazolone hydrobromide (2.51 g., .01 mol.), 2-β-acetanilidovinylbenzoxazole ethiodide (4.35 g., .01 mol.) and triethylamine (6 cc.) were heated in ethanol (10 cc.) for 5 mins. The mixture was chilled and the dye filtered off and recrystallized from ethanol as an orange, crystalline powder, M. P. 218° C.

*Example 14.*—[2-(*3-ethylbenzothiazole*)] [4-{2-(4'-morpholinyl)-5(4)-thiazolone}] *dimethinemerocyanine*

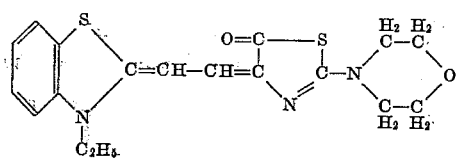

2-β-acetanilidovinylbenzothiazole ethiodide (4.5 g., .01 mol.), 2-(4'-morpholinyl)-5(4)-thiazolone hydrobromide (2.51 g.) and triethylamine (6 cc.) were heated in ethanol (10 cc.) for 5 mins. After cooling the dye was filtered off and recrystallized from benzene and then ethanol as red crystals, matted together into a wool, M. P. 208° C.

*Example 15.*—[2-(*3-ethylthiazoline*)] [4-{2-(4'-morpholinyl)-5(4)-thiazolone}] *dimethinemerocyanine*

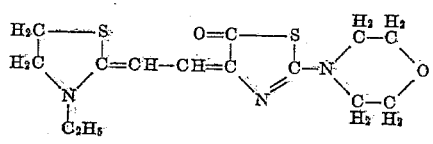

2-β-acetanilidovinylthiazoline ethiodide (4.1 g., .01 mol.), 2-(4'-morpholinyl)-5(4)-thiazolone hydrobromide (2.51 g., .01 mol.) and triethylamine (6 cc.) were heated in ethanol (10 cc.) for 5 mins. The chilled solution was filtered and the dye recrystallized from ethanol as yellow brown needles, M. P. 168° C.

*Example 16.*—[2-(*3-ethylbenzoselenazole*)] [4-{2-(4'-morpholinyl)-5(4)-thiazolone}] *dimethinemerocyanine*

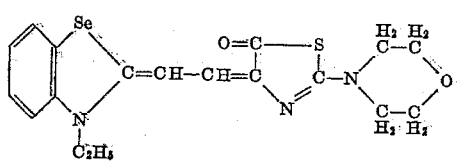

2-(4'-morpholinyl)-5(4)-thiazolone hydrobromide (2.51 g., .01 mol.), 2-β-acetanilidovinylbenzoselenazole ethiodide (5.00 g., .01 mol.) and triethylamine were heated together in ethanol (10 cc.) for 5 mins. The chilled solution was filtered and the dye recrystallized from ethanol as maroon needles, M. P. 195° C.

*Example 17.—[2-(3-ethylbenzoxazole)] [4-{2-(1'-piperidyl) - 5(4) - thiazolone}] dimethinemerocyanine*

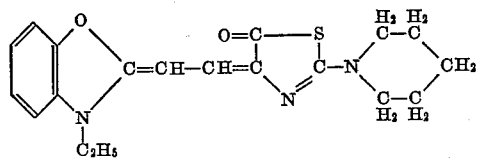

2-(1'-piperidyl)-5(4)-thiazolone hydrobromide (2.5 g., .01 mol.), 2-β-acetanilidovinylbenzoxazole ethiodide (4.35 g., .01 mol.) and triethylamine (6 cc.) were heated together in ethanol (10 cc.) for 5 mins. The mixture was cooled and the dye filtered off and recrystallized from ethanol as small brick-red crystals, M. P. 192° C.

*Example 18.—[2-(3-ethylbenzothiazole)] [4-{2-(1'-piperidyl) - 5(4) - thiazolone}] dimethinemerocyanine*

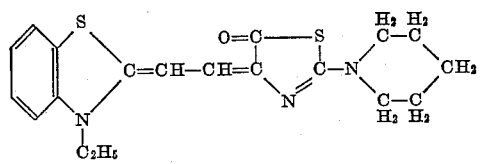

2 - β - acetanilidovinylbenzothiazole ethiodide (4.5 g., .01 mol.), 2-(1'-piperidyl)-5(4) thiazolone hydrobromide (2.5 g., .01 mol.) and triethylamine (6 cc.) were heated in ethanol (10 cc.) for 5 mins. After cooling the dye was filtered off and recrystallized from ethanol as maroon plates, M. P. 155° C.

The following examples will serve to illustrate the manner whereby we prepare the intermediates represented by Formulas IV and V above.

*Example 19.—2-diethylamino-5(4)-thiazolone hydrobromide*

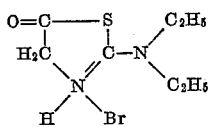

N,N-diethyl-N'-carboxymethylthiourea (2 g.) was dissolved in anhydrous dioxane (15 cc.). To this solution anhydrous ether (45 cc.) was added, followed by phosphorus tribromide (1.3 cc.). The mixture was cooled over night, and the ether was decanted from the oil which had separated, and the residue washed with anhydrous ether. The crude oil was used for dye condensations.

*Example 20.—N,N-diethyl-N'-carboxymethylthiourea*

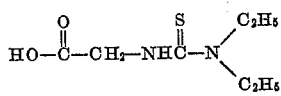

N - dithiocarbethoxyglycine (20 g.) was dissolved in a solution of potassium hydroxide (6.24 g.) in water (100 cc.). To this solution, diethylamine (11.8 cc.) was added and the mixture heated for 24 hours on the steam bath under reflux, after which it was concentrated under reduced pressure. The solution was acidified with concentrated hydrochloric acid and then left to cool, when after five days crystals appeared. These were filtered off, dried in a vacuum desiccator and recrystallized from benzene as small colourless plates, M. P. 105° C.

*Example 21.—2-ethylphenylamino-5(4)-thiazolone hydrobromide*

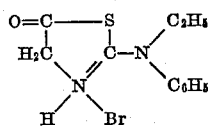

N - ethyl - N - phenyl - N' - carboxymethylthiourea (4.5 g.) was dissolved in anhydrous dioxane (25 cc.). To this solution anhydrous ether (100 cc.) was added followed by phosphorus tribromide (1.9 cc.). The mixture was cooled overnight and the ether was decanted, and the remaining oil washed with anhydrous ether. The crude oil was used for dye formation.

*Example 22.—N-ethyl-N-phenyl-N'-carboxymethylthiourea*

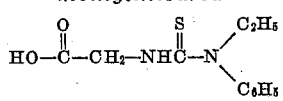

N-dithiocarbethoxyglycine (10 g.) (Korner, Ber., 1908, 41, 1901) was dissolved in a solution of potassium hydroxide (3.12 g.) in water (16 cc.) and ethanol (50 cc.). To this solution ethylaniline (6.8 g.) was added, and the mixture refluxed for 24 hours on the steam bath, after which it was diluted with water and any unreacted ethylaniline extracted with ether. The aqueous layer was acidified with concentrated hydrochloric acid, cooled and the solid filtered off and recrystallized from water as small buff colored needles, M. P. 138° C.

*Example 23.—2-(1'-piperidyl)-5(4)-thiazolone hydrobromide*

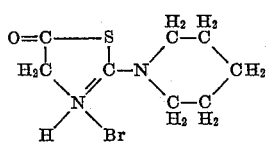

Piperidylthiocarboglycine (35 g.) was dissolved in anhydrous dioxane (200 cc.), to which solution was added anhydrous ether (200 cc.). To this solution phosphorus tribromide (47 g.) was added. On cooling the ether-dioxane mixture was decanted from the oil which had separated, which was washed with anhydrous ether and used without further purification.

*Example 24.—Piperidylthiocarboglycine*

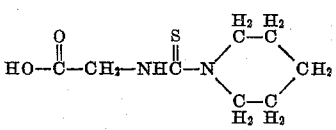

N-dithiocarbethoxyglycine (60 g.) was added to a solution of potassium hydroxide (18.72 g.) in water (250 cc.). When completely dissolved, piperidine (28.5 g.) was added and the mixture refluxed for 24 hours. On cooling the mixture was acidified with concentrated hydrochloric acid, and the white solid filtered off and recrystallized from water as white needles, M. P. 171° C.

*Example 25.—2-(4'-morpholinyl-5(4)-thiazolone hydrobromide*

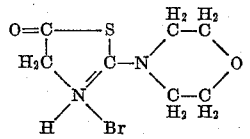

Morpholinylthiocarboglycine (20 g.) was dissolved in anhydrous dioxane (100 cc.) to which solution was added anhydrous ether (100 cc.). To this solution phosphorus tribromide (26.8 g.) was added. The solution was chilled and the supernatent liquid decanted. The oil which had separated was washed with anhydrous ether and used without further purification.

*Example 26.—Morpholinylthiocarboglycine*

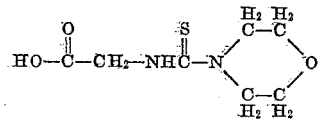

Potassium hydroxide (18.72 g.) was dissolved in water (250 cc.) and to this solution was added N-dithiocarbethoxyglycine (60 g.), followed by morpholine (28.56 g.), and the mixture refluxed for 24 hours. On cooling the solution was acidified with concentrated hydrochloric acid and the solid filtered off and recrystallized from water as long white needles, M. P. 171° C.

As shown in the above examples, the intermediates represented by Formula IV are advantageously employed in the form of their acid-addition salts, e. g. their hydrobromides, hydrochlorides, etc.

As shown above we have found that our new dyes spectrally sensitize photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver bromiodide developing-out emulsions. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of our new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory.

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What we claim as our invention and desire secured by Letters Patent of the United States is:

1. A polymethine dye selected from those represented by the following general formula:

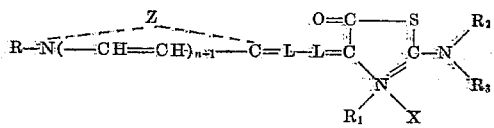

wherein R and $R_1$ each represents an alkyl group, $R_2$ and $R_3$ each represents a member selected from the group consisting of an alkyl group, an aryl group, and $R_2$ and $R_3$ together represent the non-metallic atoms necessary to complete a heterocyclic nucleus containing 6 atoms in the heterocyclic ring selected from the group consisting of those of the piperidine series and those of the morpholine series, $n$ represents a positive integer of from 1 to 2, L represents a methine group, X represents an anion, and Z represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkyl indolenine series, and those of the pyridine series.

2. The polymethine dye represented by the following formula:

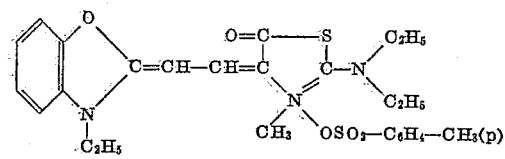

3. The polymethine dye represented by the following formula:

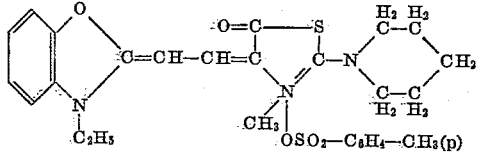

4. The polymethine dye represented by the following formula:

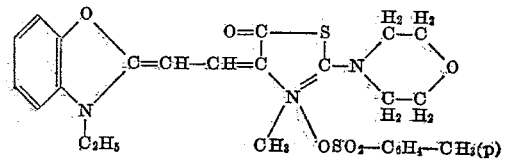

5. The polymethine dye represented by the following formula:

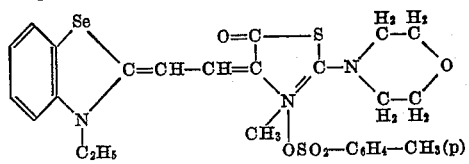

6. A process for preparing a polymethine dye comprising heating a merocarbocyanine dye selected from those represented by the following general formula:

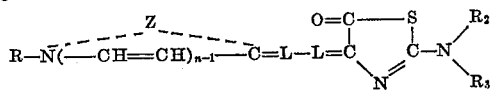

wherein R represents an alkyl group, $R_2$ and $R_3$ each represents a member selected from the group consisting of an alkyl group, an aryl group, and $R_2$ and $R_3$ together represent the non-metallic atoms necessary to complete a heterocyclic nucleus containing 6 atoms in the heterocyclic ring selected from the group consisting of those of the piperidine series and those of the morpholine series, $n$ represents a positive integer of from 1 to 2, L represents a methine group, and Z represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkyl indolenine series, and those of the pyridine series, with an alkyl salt.

7. A process for preparing a polymethine dye comprising heating a merocarbocyanine dye having the following formula:

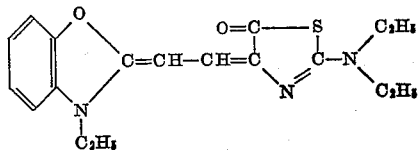

together with methyl p-toluenesulfonate.

8. A process for preparing a polymethine dye comprising heating a merocarbocyanine dye having the following formula:

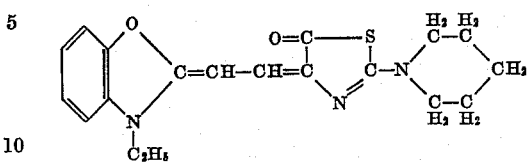

together with methyl p-toluenesulfonate.

9. A process for preparing a polymethine dye comprising heating a merocarbocyanine dye having the following formula:

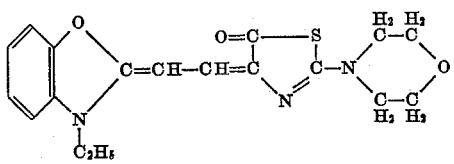

together with methyl p-toluenesulfonate.

10. A process for preparing a polymethine dye comprising heating a merocarbocyanine dye having the following formula:

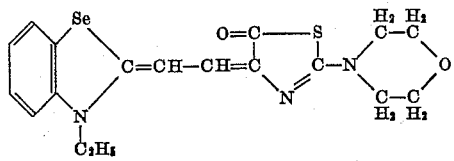

together with methyl p-toluenesulfonate.

EDWARD B. KNOTT.
LESLIE A. WILLIAMS.

References Cited in the file of this patent
UNITED STATES PATENTS

| Number | Name | Date |
|---|---|---|
| 2,527,259 | Kendall | Oct. 24, 1950 |
| 2,536,973 | Anish | Jan. 2, 1951 |
| 2,536,986 | Thompson | Jan. 2, 1951 |